United States Patent [19]

Moran

[11] 3,894,519

[45] July 15, 1975

[54] ROTARY INTERNAL COMBUSTION ENGINE

[76] Inventor: George W. Moran, 9836 Shadydale, Dallas, Tex. 75238

[22] Filed: May 31, 1973

[21] Appl. No.: 365,413

[52] U.S. Cl. .............. 123/8.45; 418/139; 418/186; 418/245
[51] Int. Cl. .......................................... F02b 55/16
[58] Field of Search .......... 123/8.45; 418/186, 187, 418/94, 101, 245, 248

[56] References Cited
UNITED STATES PATENTS

| | | | |
|---|---|---|---|
| 1,242,693 | 10/1917 | Hibner | 418/248 X |
| 1,427,692 | 8/1922 | Mahon et al. | 123/8.45 |
| 2,500,458 | 3/1950 | Hinckley | 418/139 X |
| 2,717,555 | 9/1955 | Hinckley | 418/248 X |
| 3,244,157 | 4/1966 | Tanferna et al. | 123/8.45 |
| 3,326,454 | 6/1967 | DeCoye DeCastelet | 418/123 |

FOREIGN PATENTS OR APPLICATIONS

| | | | |
|---|---|---|---|
| 451,076 | 2/1913 | France | 123/8.45 |
| 547,592 | 4/1932 | Germany | 123/8.45 |

*Primary Examiner*—William L. Freeh
*Assistant Examiner*—Michael Koczo, Jr.
*Attorney, Agent, or Firm*—Howard E. Moore; Gerald G. Crutsinger

[57] ABSTRACT

A rotary internal combustion engine comprising an oval shaped rotor secured to a compartmentalized shaft rotatably disposed in a cylindrical bore in a stationary engine block. A plurality of vanes are pivotally secured to the block and arranged to move into the cylindrical bore into sealing engagment with the outer surface of the rotor. Fuel and air are delivered through the compartmentalized shaft into chambers between adjacent vanes where fuel is compressed, ignited, and allowed to expand applying torque to the oval shaped rotor. Products of combustion and fresh air are delivered to an exhaust compartment in the compartmentalized shaft before exhausting to atmosphere.

15 Claims, 15 Drawing Figures

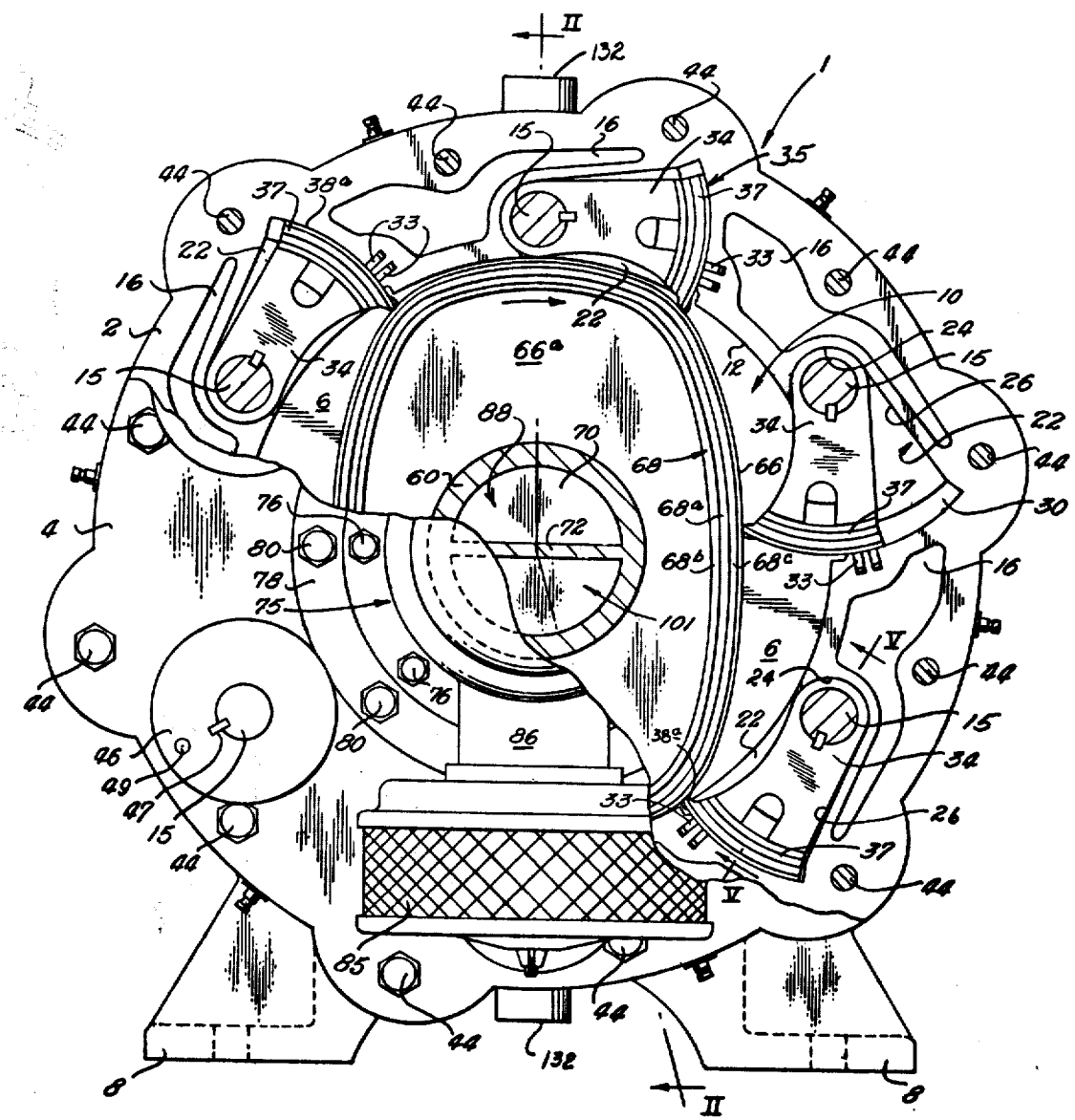
Fig. I

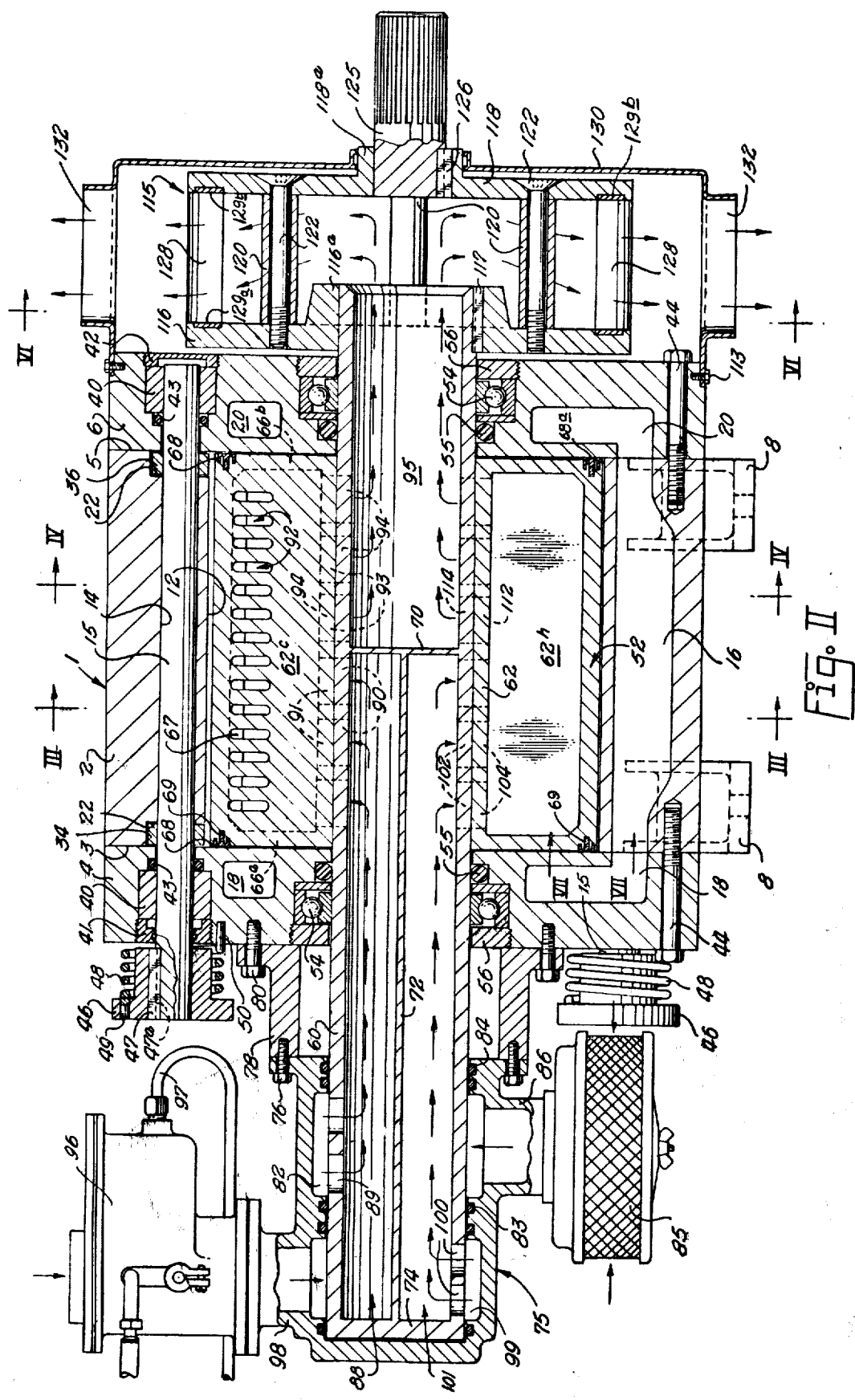
Fig. II

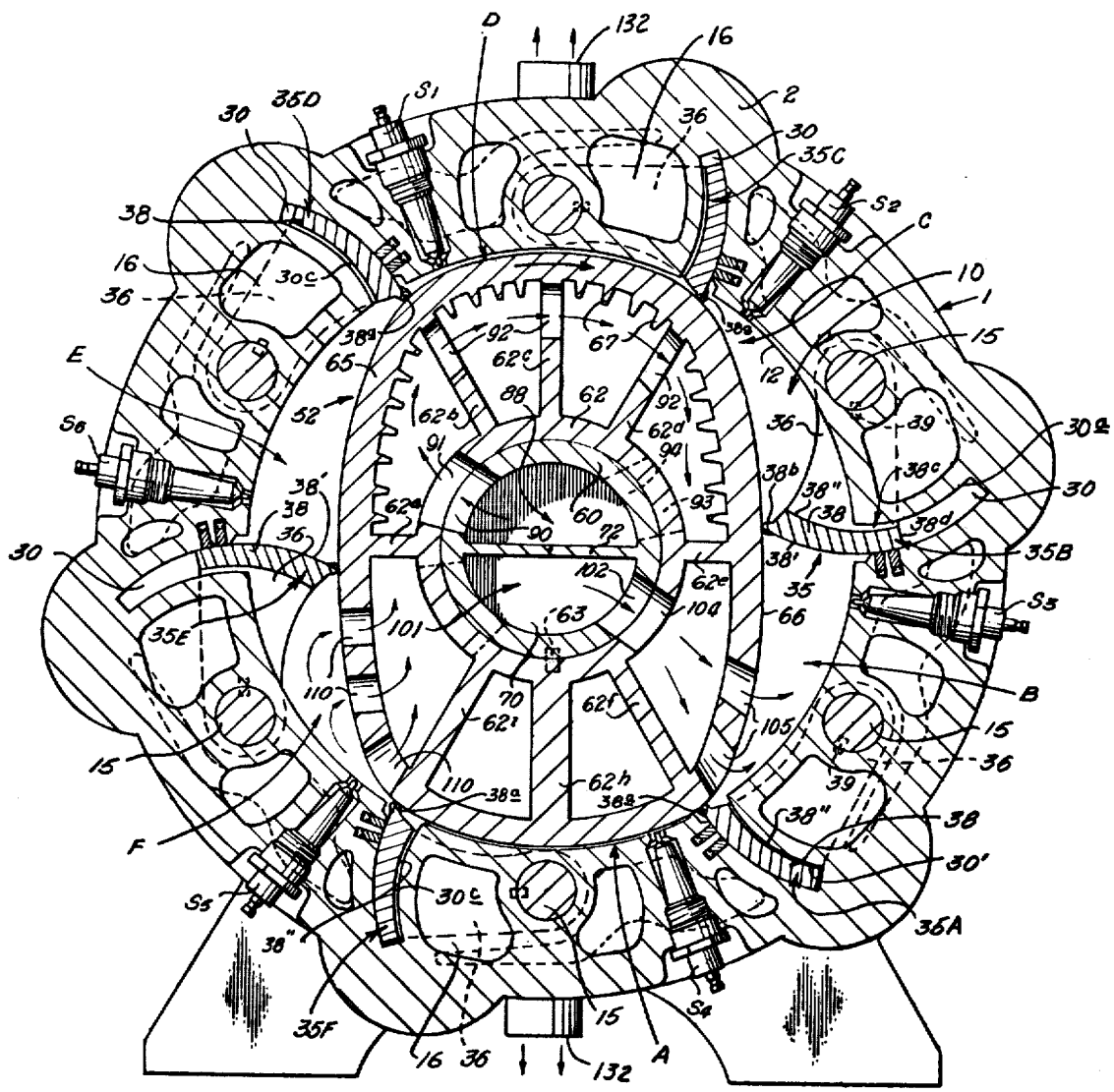
Fig. III

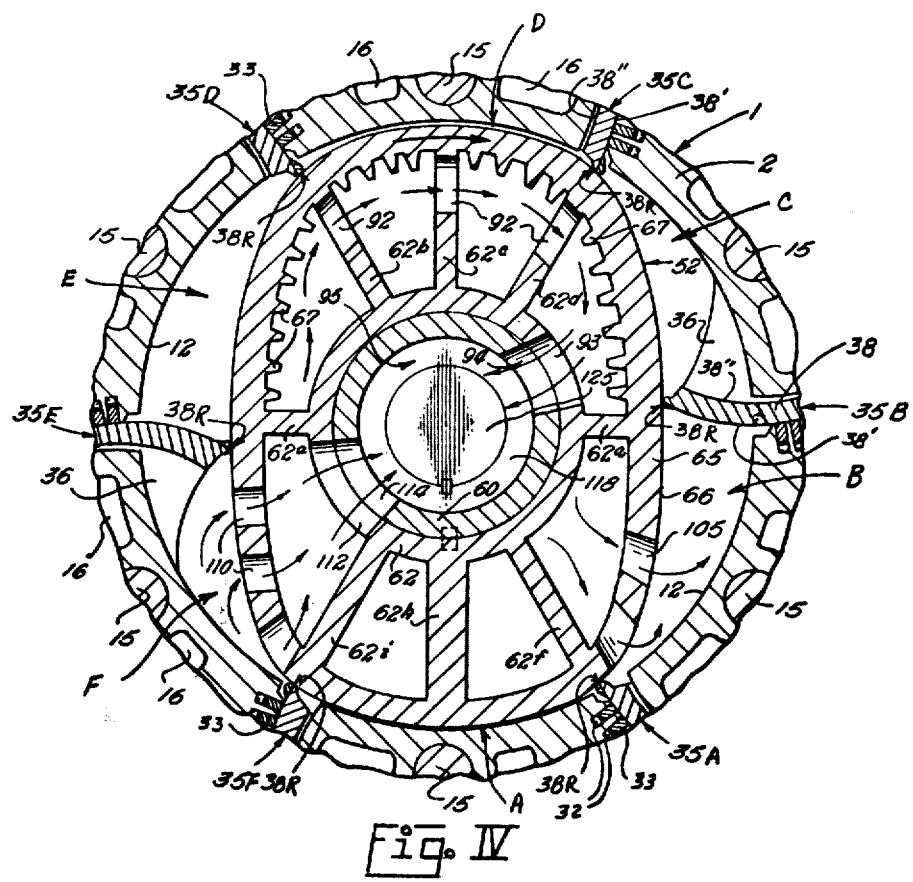
Fig. IV
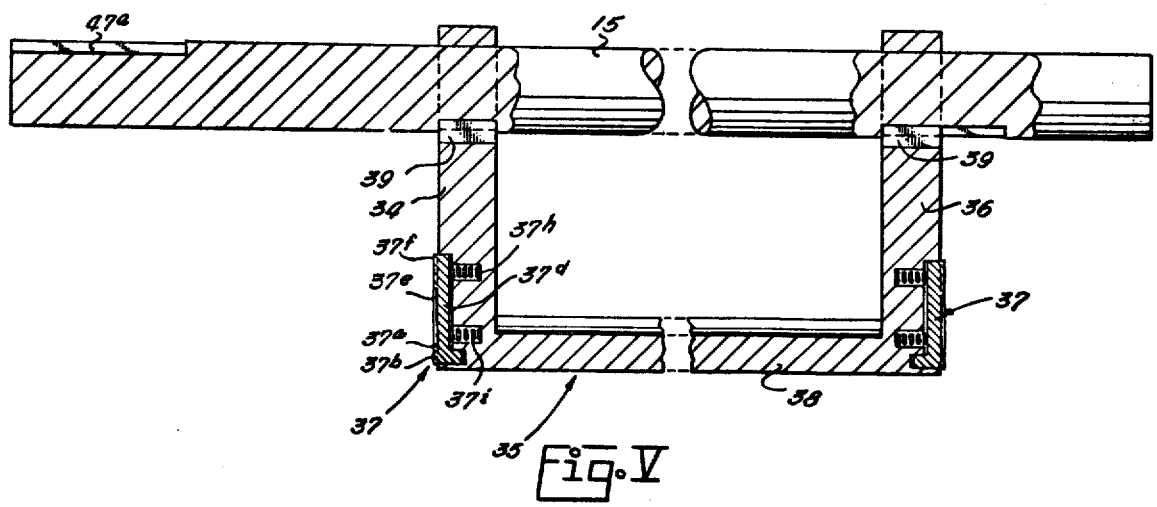
Fig. V

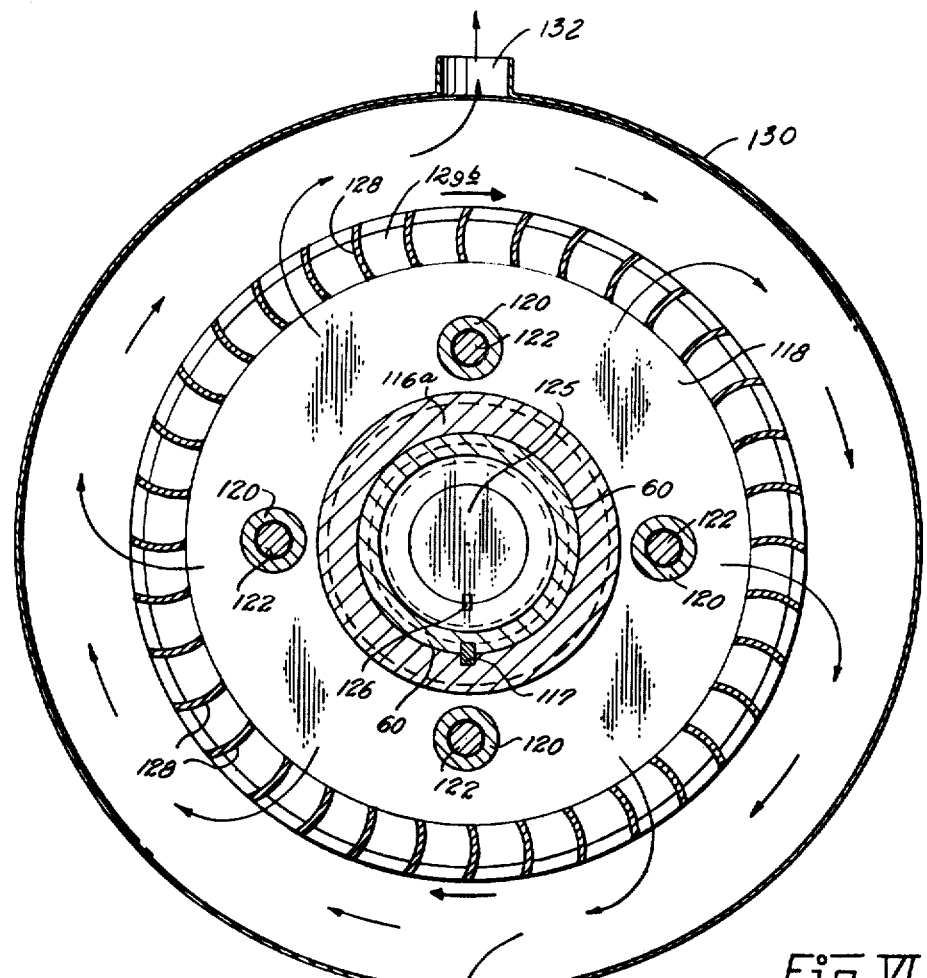
Fig. VI
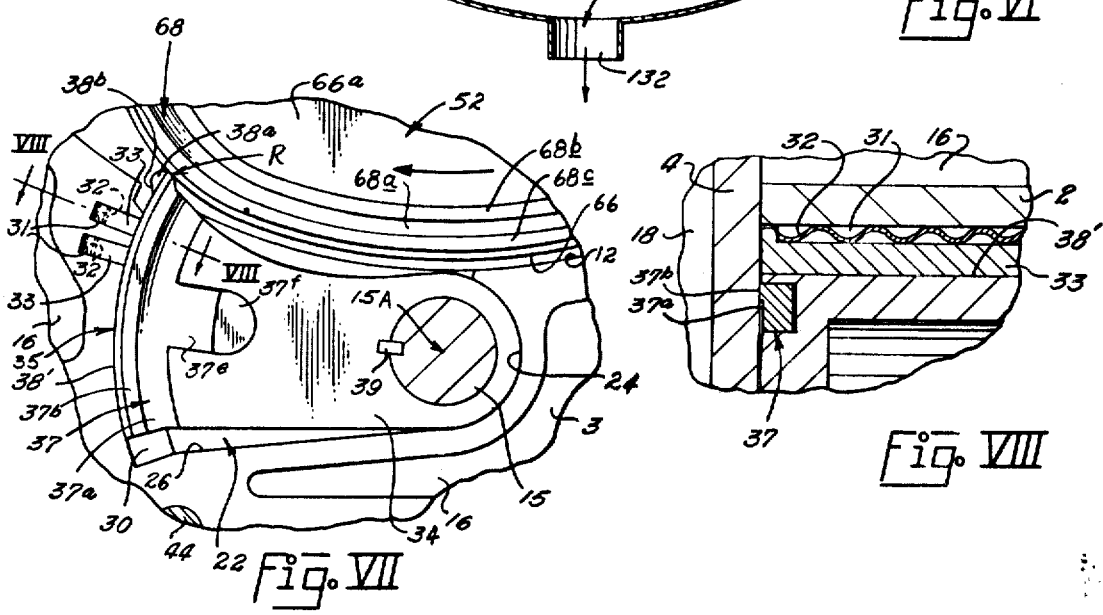
Fig. VII
Fig. VIII

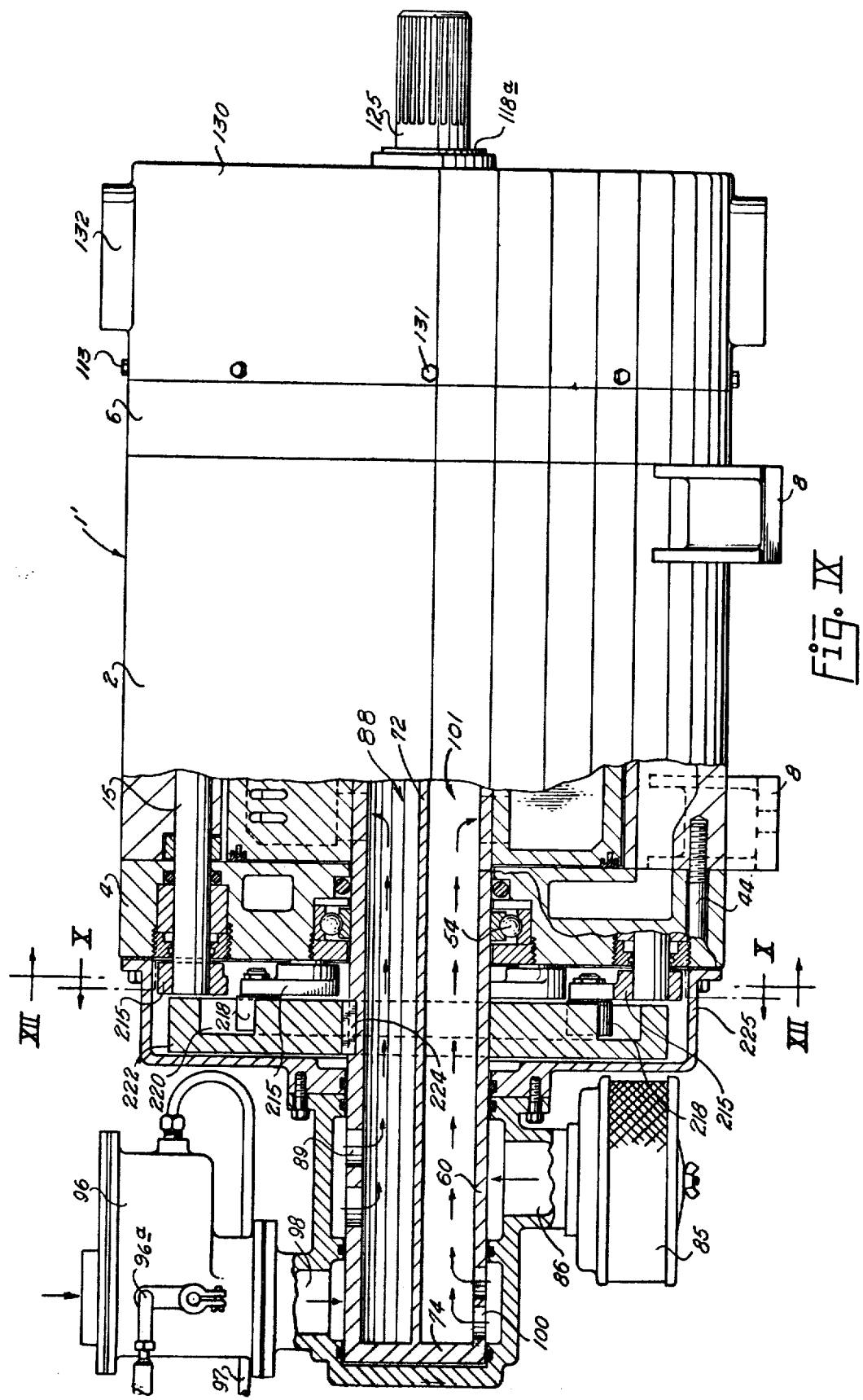

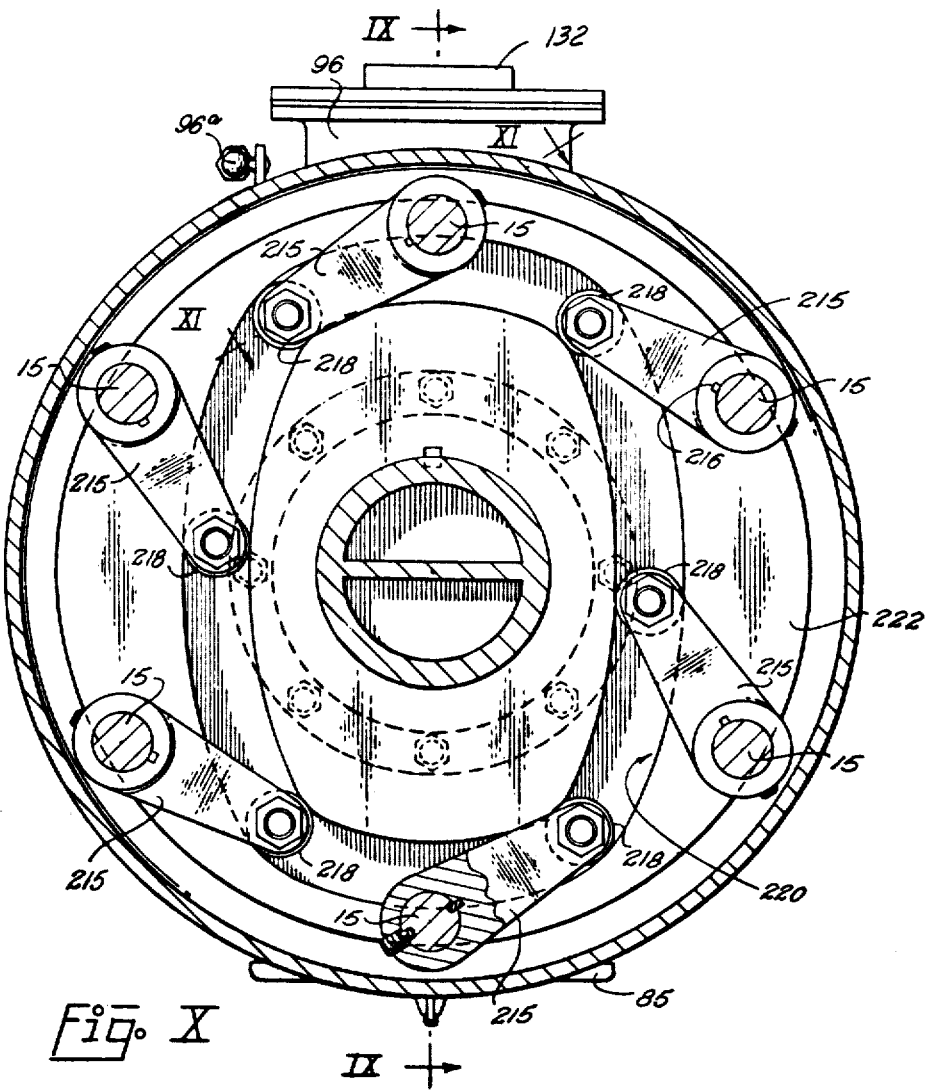
Fig. X
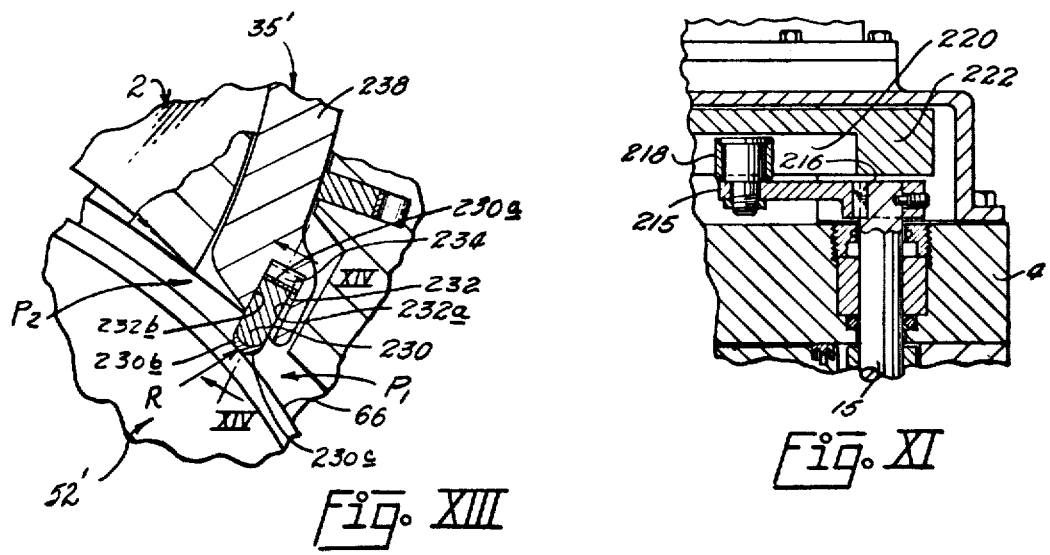
Fig. XIII
Fig. XI

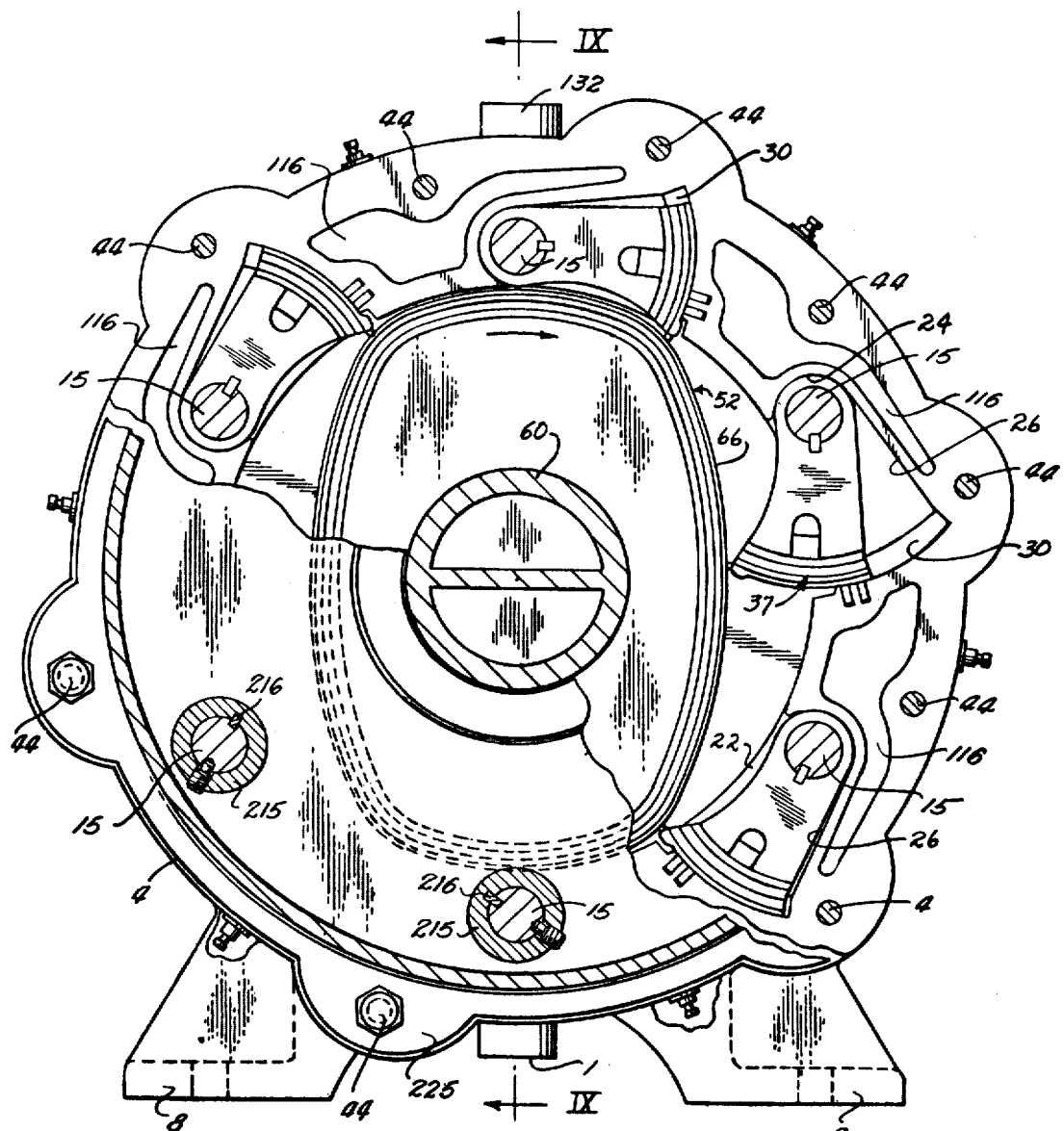
Fig. XII
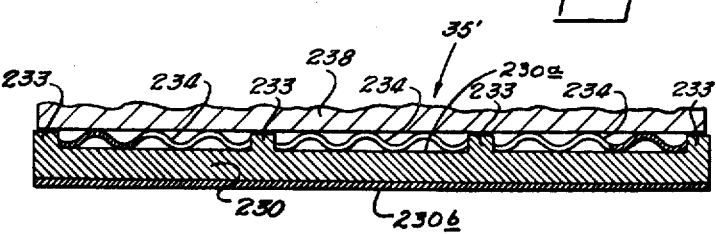
Fig. XIV

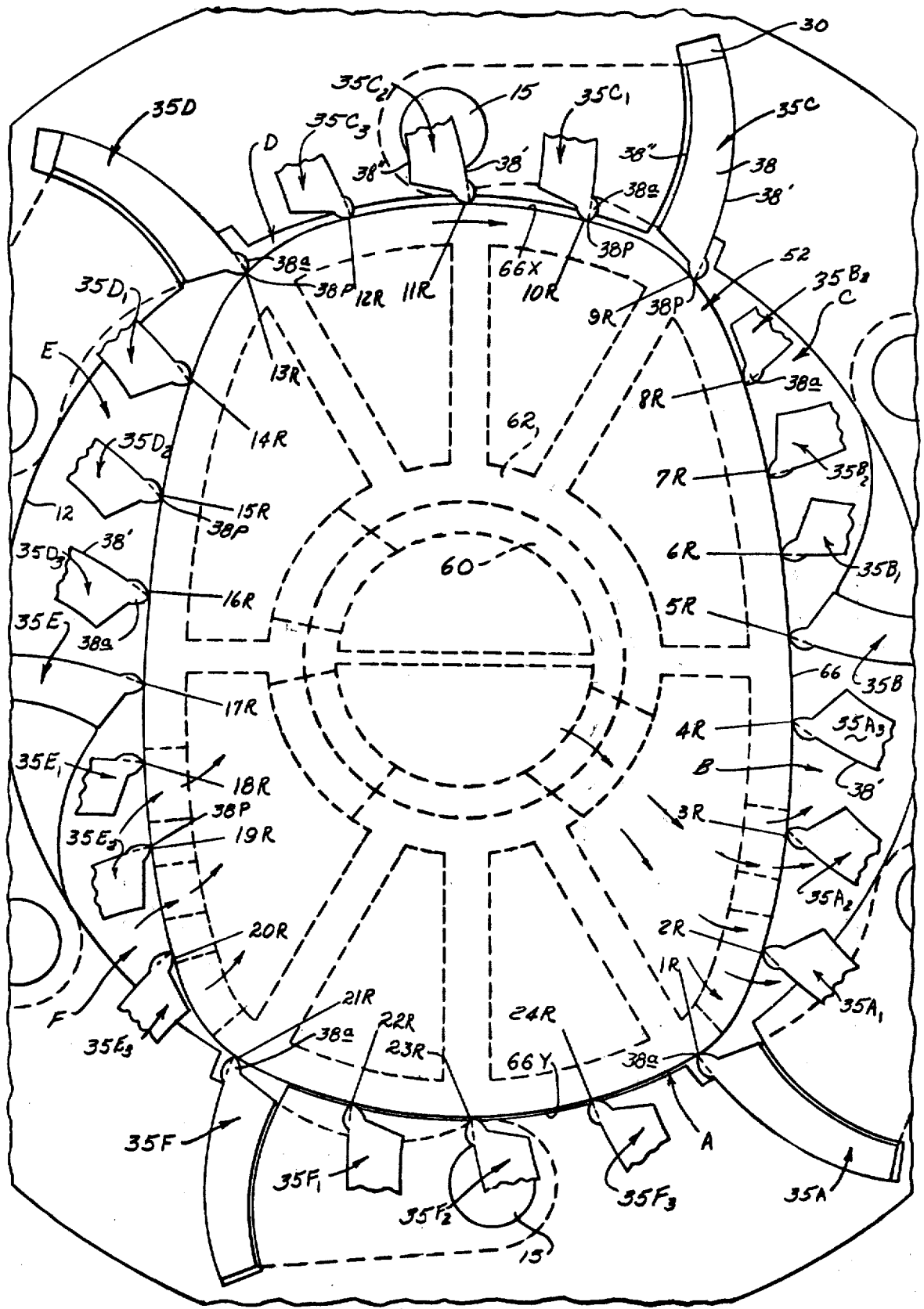
Fig. XV

ROTARY INTERNAL COMBUSTION ENGINE

BACKGROUND OF INVENTION

Internal combustion engines, those in which fuel is burned in a chamber for transferring energy to an output shaft, have been thermally inefficient.

The most common types of internal combustion engines have employed reciprocating pistons movable through a cylinder completing a cycle comprising fuel intake, compression, expansion and exhaust.

Four stroke cycle engines have substantial mechanical losses in valve operating mechanisms while two stroke cycle engines incur power loss in compressing scavenging medium.

Rotary internal combustion engines were predecessors of the reciprocating internal combustion engine. However, the rotary engine was for many years considered inferior to reciprocating engines. Recent advances in rotary engine design have resulted in development of rotary engines having speeds, weight per unit of power output, and durability comparable to that of reciprocating engines.

Designers of both rotary and reciprocating internal combustion engines have encountered two basic problem areas in which no satisfactory solution has been heretofore devised.

A first problem area involves scavenging the exhaust gases from the combustion chamber before a new charge of fuel is admitted. Incomplete scavenging results in dilution of the fuel-air mixture by residual gases causing incomplete combustion. Incomplete combustion results in reduction in thermal efficiency and discharge of carbon monoxide and hydrocarbons into the atmosphere.

Many engine manufacturers, as a result of the inability to obtain complete combustion in engines, have attached emission control systems for mixing air with exhaust gases creating combustion in the exhaust system in an effort to complete combustion before exhaust gases are released to the atmosphere to minimize air pollution.

A second problem area has involved leakage of fuel during compression and leakage of expanding gas after ignition of fuel in a combustion chamber.

Rotary engines heretofore devised have employed rotors which were eccentrically mounted on a central shaft, or which had vanes movably secured to a rotor which was eccentrically mounted in an opening formed in a rotor housing. Eccentric mounting of the rotor resulted in a dynamic imbalance of forces while moving vanes, spring urged outwardly to obtain a seal at low speeds, were damaged as a result of excessive centrifugal force at high speeds which caused excessive stress and frictional wear.

SUMMARY OF INVENTION

I have devised an improved rotary internal combustion engine having a substantially oval shaped rotor dynamically balanced about a central axis having an outer surface engageable by sealing surfaces on pivotal vanes secured to a stationary rotor housing having a cylindrical bore disposed therein.

Pressure between contacting surfaces of the vanes and the rotor is not affected by the speed of rotation of the rotor.

The rotor is shaped such that minimal clearance exists between the surface of the rotor and surfaces of the bore in the rotor housing to minimize the chamber volume capable of being occupied by exhaust gases, thus assuring substantially complete scavenging and minimizing dilution of fresh charges of fuel.

The vanes pivotally secured to the rotor housing are shaped such that pneumatic forces within the chambers to be sealed are employed during the compression and power cycle for urging the vanes into sealing relation with the surface of the rotor. Thus, as pressure increases the sealing capacity is increased.

Air and fuel-air mixtures are delivered through a compartmentalized central shaft upon which the rotor is mounted to provide cooling of surfaces of the rotor, to preheat the fuel-air mixture to insure vaporization of the fuel, and to provide a supercharging effect as a result of centrifugal force.

A primary object of the invention is to provide an internal combustion engine capable of scavenging substantially all of the products of combustion from combustion chambers without effecting the compression ratio of the fuel-air mixture at the time of ignition.

Another object of the invention is to provide an internal combustion engine incorporating improved seal means to minimize leakage of pressurized gas from the combustion chamber, said seal means being arranged such that any unburned gas that passes adjacent thereto will be burned in an adjacent combustion chamber.

Another object of the invention is to provide an internal combustion engine having seal means arranged such that pressure within a chamber is applied to the sealing means such that an increase in pressure results in an increase in the sealing effectiveness of the seal means.

A further object of the invention is to provide a rotary internal combustion engine having sealing elements urged into sealing relation with a rotor wherein contacting pressure therebetween is independent of the speed of rotation of the rotor.

A further object of the invention is to provide a rotary internal combustion engine which is dynamically balanced to minimize vibration and wear of component parts thereof.

A still further object of the invention is to provide a rotary internal combustion engine having a plurality of combustion chambers arranged for sequential ignition of fuel in the chambers such that torsional force exerted upon the rotor is substantially constant.

Other and further objects of the invention will become apparent upon referring to the detailed description hereinafter following and to the drawings annexed hereto.

DESCRIPTION OF DRAWINGS

Drawings of two preferred embodiments of my invention are annexed hereto so that the invention may be better and more fully understood, in which:

FIG. I is an end view of the rotary internal combustion engine, portions being broken away to more clearly illustrate details of construction;

FIG. II is a cross-sectional view taken substantially along line II—II of FIG. I;

FIG. III is a cross-sectional view taken substantially along line III—III of FIG. II;

FIG. IV is a cross-sectional view taken substantially along line IV—IV of FIG. II;

FIG. V is a fragmentary cross-sectional view taken substantially along line V—V of FIG. I;

FIG. VI is a cross-sectional view taken along line VI—VI of FIG. II;

FIG. VII is an enlarged fragmentary cross-sectional view taken substantially along line VII—VII of FIG. II;

FIG. VIII is a cross-sectional view taken along line VIII—VIII of FIG. VII;

FIG. IX is a fragmentary cross-sectional view similar to FIG. II illustrating a modified form of the invention;

FIG. X is a cross-sectional view taken along line X—X of FIG. IX;

FIG. XI is a fragmentary cross-sectional view taken along line XI—XI of FIG. X;

FIG. XII is a cross-sectional view taken along line XII—XII of FIG. IX;

FIG. XIII is an enlarged fragmentary view of the sealing element between a vane and the rotor;

FIG. XIV is a cross-sectional view taken along line XIV—XIV of FIG. XIII; and

FIG. XV is a diagrammatic view illustrating points or lines of contact between surfaces of the vanes and the rotor.

Numeral references are employed to designate like parts throughout the various figures of the drawing.

DESCRIPTION OF A FIRST EMBODIMENT

Referring to FIG. 1 of the drawing the numeral 1 generally designates a rotor housing comprising a central block 2 having end plates 4 and 6 secured to opposite ends thereof.

Block 2 has suitable anchorage means such as lugs 8 secured thereto for attachment of rotor housing 1 to suitable support means, as by bolts.

Block 2 of rotor housing 1 has a cylindrical bore 10 extending longitudinally therethrough, said bore having a wall 12.

Block 2, in the particular embodiment of the invention illustrated in the drawing has six longitudinally extending passages 14 formed therein, spaced circumferentially about bore 10 to receive rocker shafts 15, as will be hereinafter more fully explained.

Coolant passages 16 extend longitudinally thru block 2 and communicate with coolant passages 18 and 20, formed in end plates 4 and 6. Suitable means (not shown) is employed for circulating a suitable medium, such as water, thru passages 16, 18 and 20 to dissipate excess heat from rotor housing 1.

End faces 3 and 5 of block 2 have recesses 22 formed therein to receive arms 34 and 36 upon which sealing vanes 35 are mounted as will be hereinafter explained.

Each recess 22 has a semi-circular end 24 and an edge 26 tangentially disposed thereto, such that recess 22 has a wedge-shaped configuration, one side of recess 22 opening into the cylindrical bore 10 extending through block 2. The wide end of recess 22 communicates with a truncated crescent-shaped vane receiving passage 30 extending longitudinally through block 2. Opposite ends of passage 30 communicate with recesses 22 formed in end faces 3 and 5 of block 2.

As best illustrated in FIGS. III and V vanes 35 comprise arms 34 and 36 secured to opposite ends of a truncated crescent-shaped central portion 38. Each arm 34 and 36 has an aperture extending therethrough into which rocker shaft 15 extends. Keys 39 prevent rotation of arms 34 and 36 about shaft 15.

As best illustrated in FIG. II end plates 4 and 6 of rotor housing 1 have passages formed therein into which shaft 15 extends. Bearings 40 extend into the openings and are retained therein by retainer rings 41 and 42. Suitable seal means 43 is employed to prevent leakage about shaft 15.

End plates 4 and 6 are secured to the block 2 by bolts 44.

Suitable gaskets (not illustrated) are employed between end plates 4 and 6 and faces 3 and 5 of engine block 2 to prevent leakage of liquid and gas between adjacent surfaces.

Each rocker shaft 15 has a collar 46 detachably secured thereof by a key 47. A spring 48 has a first end 49, secured to collar 46 and a second end 50 secured to endwall 4 such that rocker shaft 15 is urged to a position wherein sealing surfaces 38a adjacent the edge of the central portion 38 of each vane 35 is urged into sealing relation with the outer surface of rotor 52.

Rotor 52 is rotatably disposed in passage 10 extending through engine block 2.

As best illustrated in FIGS. VII and VIII, engine block 2 has spaced grooves 31 formed therein opening into passage 30 through which the central portion 38 of vane 35 extends. Springs 32 extend longitudinally of grooves 31 and urge seal elements 33 into sealing engagement with the convex semi-cylindrical face 38' of truncated crescent-shaped central portion 38 of vane 35.

As best illustrated in FIGS. III and VII the central portion 38 of vane 35 has a sealing bead 38a extending along the edge thereof adjacent the convex surface 38', urged into sealing relation with the outer surface 66 of rotor 52 by spring 48.

Sealing beads 38a (FIG. VII) urged against the outside surface 66 of rotor 52 are milled or grounded to a curvature such that, as the rotor 52 turns and the vanes 35 oscillate, the line of contact of each bead 38a with the rotor 52 shifts such that pressure of gases in chambers A–F, during the compression and combustion cycles, urge vanes 35 to move toward surfaces 66 of rotor 52, thus intensifying the pressure exerted by springs 48 in holding sealing surfaces on vanes 35 firm against surface 66 of rotor 52.

As illustrated in FIG. XV, the contour of this sealing bead 38a and the contour of the outer surface 66 of rotor 52 are coordinated so that, as the rotor turns and the vanes 35 oscillate, the line of contact between beads 38a and outer surface 66 of rotor 52 shifts in such a way as to cause pressure of the gases in chambers A-F to press vanes 35 toward surface 66 of rotor 52 during most of the compression and combustion cycles and to have no appreciable effect on the movement of the vanes during the intake and exhaust cycles. Just how this takes place is fully explained in the following paragraphs. To understand how this takes place, however, it is necessary to keep in mind that fluid pressure in each respective chamber A–F (See FIG. III) acts equally against all surfaces within each chamber A–F which includes surface areas of the front and back of each vane 35 and the arms 34, 36, that support them. It is on these surface areas (on the front and back of vanes 35 and arms 34 and 36) that the changing pressures of the gases tend to push the vanes 35 inwardly toward rotor 52 or outwardly away from the rotor 52.

As best illustrated in FIG. XV, tips of sealing beads 38a are milled or ground so that the contour of a cross section of the tips resembles a rounded "V" with the apex of the rounded portion coinciding with a projection of the arc of the convex surface 38' of vanes 35.

Point 38P in future references, shall indicate the point at which the projection of said arc penetrates the apex of the rounded V portion of sealing bead 38a.

Referring to FIG. XV, it should be observed that this drawing reveals the angle of contact, between sealing bead 38a and surface 66 of the rotor in 24 locations (one every 15 degrees) around rotor 52. This figure also reveals that during one revolution of rotor 52 the line of contact between surface 66 of the rotor and bead 38a of vanes 35 shifts across the face of bead 38a from one side of point 38P to the other side. As illustrated at point 13R on the rotor, point 38P on bead 38a coincides with line of contact between bead 38a and surface 66 of the rotor. At point 9R on the rotor, the contact point between surface of rotor 66 and bead 38a, is inside point 38P (inside a projected arc of convex surface 38' of vanes 35) and that at point 15R on the rotor this contact point is outside point 38P.

Since the line of contact between the face of bead 38a and surface 66 of the rotor is the dividing line between operational chambers A–F, a shifting of this line of contact on the face of bead 38a also shifts areas, exact in extent, on the face of bead 38a from one operational chamber to the other.

When point 38P on the face of bead 38a coincides with the line of contact between sealing bead 38a and surface 66 of rotor 52, as illustrated at point 13R on the rotor, the areas on both the concave and convex side of vanes 35, on which the pressure of adjacent gases tend to press the vane outward (counter-clockwise), are exactly equal to the area of surfaces on which pressure of the gases act tending to press the vanes inward (clockwise). The net result being, no effect on the inward or outward movement of the vanes, this, regardless of whether the gas pressures on each side of vane are equal or unequal.

When the line of contact R between rotor surface 66 and bead 38a is inside point 38P on the face of bead 38a, as illustrated at point 9R, an area on the face of bead 38a, exact in extent, has been shifted from the operational chamber adjacent the concave side 38'' of the vane, to the operational chamber adjacent the convex side 38' of the vane, with the result that the areas on the concave side 38'' of vane, on which the pressure of the gases tend to press the vane inward, are now greater than the areas, on which the pressure of the gases tend to press the vane outward (counter-clockwise). The net result being an inward (clockwise) force on the vane.

On the convex side 38' of the vane the situation is exactly reversed. The areas, on which the pressure of the adjacent gases tend to press the vane outward are now greater than the areas on which the pressure of the gases tend to press the vane inward (clockwise) with the net result being an outward (counter-clockwise) force on the vane.

When the adjacent gas pressures on both the concave and convex sides of the vane are equal, (as illustrated at points on rotor 18R, 19R, 20R and 2R and 3R) the net result is no in or out pressure on vane. If the pressures are unequal the side of vane adjacent the highest pressure of gas prevails.

When the line of contact between rotor surface 66 and bead 38a is outside point 38P on the face of bead 38a, as illustrated at point 15R, the results are exactly reversed to those expressed in the preceding paragraph. The only thing in common is when the gas pressures on both the concave and convex side of the vane are equal, the result is, no inward or outward pressure on the vane.

When point 38P on sealing bead 38a coincides with the line of contact between sealing bead 38a and surface 66 of rotor 52, the gas pressure on either the concave or convex side of vane has no effect on the in or out movement of the vane.

When the contact line between sealing bead 38a and surface 66 on rotor 52 is inside point 38P on bead 38a the pressure of gases adjacent to concave side 38'' of the vane tend to press the vane inward (clockwise) and pressure of gases on the convex side 38' of the vane tend to press the vane outward (counter-clockwise). The side of the vane adjacent the highest pressure of gases prevails.

When the contact line R between sealing bead 38a is outside point 38P, on sealing bead 38a, the pressure of gases on the concave side of the vane tends to press the vane outward (counter-clockwise) and pressure of gases on the convex side of the vane tend to press the vane inward (clockwise). The side of the vane adjacent the highest gas pressure prevails.

When pressure of gases on both the concave and convex sides of vane are equal the pressure of the gases have no effect on the in or out movement of the vane.

Applying these observations to the positions of vanes 35A–35F as drawn in FIG. XV, it is apparent that gas pressure on each side of vane 35A has no effect on its in or out movement for the reason that point 38P and contact line 1R between bead 38a and rotor surface 66 coincide. The same thing applies to vane 35B.

The line of contact 9R between the surface 66 on the rotor and the face of bead 38a of vane 35C is inside point 38P. Since the pressure of gases on the concave side 38'' of the vane is greater (the near maximum pressure of the compression cycle) than the gases on the convex side 38' of vane (compression cycle just beginning) the net pressure of gases on vane 35C is inward (clockwise) against the rotor.

The pressure of gases on each side of vane 35D has no effect on its' in or out movement for the reason that point 38P and contact line 13R between sealing bead 38a of vane 35D and surface 66 of rotor coincide. The same applies to vanes 35E and 35F.

Assuming the rotor 52 is turned clockwise 15°, vane 35A would then occupy the position $35A_1$, in relation to rotor 52, vane 35B, position $35B_1$, etc. through all vanes through 35F.

In these positions: movement of vane $35A_1$ is not effected by pressure of gases for the reason that pressure is the same on both sides of the vane. Movement of vane $35B_1$ is not effected by pressure of gases for the reason that point 38P on bead 38a coincides with the line of contact 6R between bead 38a and surface 66 of rotor 52.

Net pressure of gases on vane $35C_1$ is inward (clockwise) for the reason that the contact line 10R between the face of bead 38a and surface 66 of the rotor is inside point 38P on bead 38a. Gas pressure on the concave side of the vane is higher (in the combustion cycle) than pressure on convex side of vane (in mid-compression cycle).

Net pressure of gases on vane $35D_1$ is inward (clockwise) against the rotor for the reason that the contact line 14R between the face of bead 38a and surface 66 of the rotor is outside point 38P on bead 38a. Gas pressure on the convex side of the vane is higher (combustion cycle in first stages) than pressure on the concave side of the vane (combustion cycle almost finished).

Pressure of gases on vane $35E_1$ have no effect for the reason that gas pressure on both sides of the vane are equal. Pressure of gases on vane $35F_1$ have no effect for the reason that point 38P and the line of contact 22R between bead 38a and the surface 66 of the rotor coincide.

Upon turning the rotor clockwise another 15° vane 35A will then occupy the position $35A_2$ in relation to the rotor, vane 35B, position $35B_2$, etc. for all vanes through 35F.

In these positions: movement of vane $35A_2$ is not effected by pressure of gases for the reason that pressure of gases are equal on both sides of vane. Net pressure of gases on vane $35B_2$ is inward (clockwise) for the reason that contact line 7R between the face of bead 38a and surface 66 of rotor is inside point 38P on bead 38a and gas pressure on the concave side of vane is higher (in mid-compression cycle) than gases on the convex side of vane (in intake cycle). Net pressure of gases on vane $35C_2$ is inward (clockwise) for the reason that the contact line 11R between face of bead 38a and surface 66 of the rotor is inside point 38P on bead 38a and gas pressure on the concave side 38'' of the vane is greater (in combustion cycle) than gas pressure on the convex side 38' (in mid-compression cycle). Net pressure of gases on vane $35D_2$ is inward (clockwise) for the reason that contact point 15R between the face of bead 38a and surface 66 of rotor is outside of point 38P on bead 38a and the pressure of gases on the convex side of vane is higher (in combustion cycle) than pressure of gases on concave side of vane (in exhaust cycle). Pressure of gases on both sides of vane $35E_2$ have no effect on movement of vane for the reason that gas pressure on both sides of vane is equal. Pressure of gases on vane $35F_2$ have no effect for the reason that point 38P on bead 38a and line of contact 23R between 38a and surface 66 on rotor coincide.

Upon turning the rotor still another 15°, vane 35A will then occupy the position $35A_3$ in relation to rotor 52, vane 35B, position $35B_2$, etc. for all vanes.

In these positions pressure of gases on vane $35A_3$ have no effect on movement of the vane for the reason that point 38P on bead 38a coincides with line of contact 4R between bead 38a and surface 66 on rotor.

Net pressure of gases on vane $35B_3$ is inward (clockwise) for the reason that contact line 8R between face of bead 38a and surface 66 of rotor is inside point 38P on bead 38a and the pressure on concave side 38'' of vane is higher (near end of compression cycle) than pressure on convex side 38' of the vane (first stages of compression cycle).

Net pressure on vane $35C_3$ is inward (clockwise) for the reason that the contact line 12R between the face of bead 38a and surface 66 of the rotor is inside point 38P on bead 38a and gas pressure on the concave side 38'' of the vane is higher (in combustion cycle) than gas pressure on the convex side 38' of the vane (in compression cycle).

Net pressure of gases on vane $35D_3$ is inward (clockwise) for the reason that the contact point 16R between the face of bead 38a and surface 66 of the rotor is outside of point 38P on bead 38a and pressure of gases on the convex side of the vane is higher (in combustion cycle) than pressure of gases on concave side of vane (in exhaust cycle).

Pressure of gases on vane $35E_3$ have no effect on movement of the vane because gas pressures on both sides of the vane are equal.

Pressure of gases on vane $35F_3$ have no effect on movement of the vane for the reason that point 38P on bead 38a coincides with line of contact 24R between bead 38a and the surface 66 of the rotor.

From the foregoing it is evident that pressure of the gases in the operational chambers A-F press the vanes inward (clockwise) at points 7R, 8R, 9R, 10R, 11R, 12R, 14R, 15R, 16R on the rotor, which includes most of the compression and combustion cycles, and that at points 1R, 2R, 3R, 4R, 5R, 6R, 13R, 17R, 18R, 19R, 20R, 21R, 22R, 23R, and 24R, pressure of the gases have no appreciable effect on the inward or outward movement of the vanes.

Main bearings 54 and grease seals 55 (FIG. II) are maintained in central openings extending through end plates 4 and 6 of rotor housing 1 by threaded retainer rings 56. A compartmentalized shaft 60 is rotatably disposed in bearings 54 and extends through a central hub 62 of rotor 52.

Shaft 60 and hub 62 are secured together by a key 63.

Rotor 52, as best illustrated in FIGS. I, II, and III, comprises tubular hub 62, having partitions 62a, 62b, 62c, 62d, 62e, 62f, 62h, and 62i, extending radially therefrom supporting an elongated cylindrical member 65, having an oval shaped crosssection.

End walls 66a and 66b extend between outer cylindrical member 65 and central hub 62 of rotor 52.

End walls 66a and 66b have grooves formed therein adjacent the outer periphery thereof for receiving rotor end seals 68 which are urged outwardly by springs 69. Seals 68 have a groove 68a formed in the face thereof such that outwardly extending portions 68b and 68c are disposed in wiping engagement with the inner surface of end plates 4 and 6 of rotor housing 1.

As best illustrated in FIGS. I, V and VII, vanes 35 have seal elements 37 disposed in grooves formed in outer ends of arms 34 and 36. Each seal 37 is curved, having a center of curvature coinciding with the axis 15A of shaft 15 upon which vane 35 is mounted. Seal 37 has a groove 37a formed in the face thereof, such that surface 37b adjacent a side of groove 37a is urged into sealing relation with inner surface of end plate 4.

The central portion of seal 37 has a leg 37d extending radially therefrom, groove 37a being formed intermediate surfaces 37b and 37f. Springs 37h and 37i urge surfaces 37b and 37f into sealing engagement with the end wall 4 of rotor housing 1. Leg 37d prevents movement of seal 37 as arms 34 and 36 oscillate about shaft 15.

Compartmentalized shaft 60 has a transversally extending partition 70 across the longitudinally extending bore. A longitudinally extending partition 72 extends between partition 70 and end closure member 74. An air and fuel intake manifold 75 is secured by bolts 76 to a connector 78, which is secured by bolts 80 to the end plate 4 of rotor housing 1.

Manifold 75 has an annular passage 82 having seal elements 83 and 84 disposed on opposite sides thereof positioned in sealing engagement with the outer surface of shaft 60. An air cleaner 85, preferably comprising a foraminous filter element communicates, through conduit 86, with annular passage 82.

An air intake compartment 88 in shaft 60 is defined by the wall of the shaft, closure member 74, longitudinally extending partition 72 and transversely extending partition 70.

Air intake openings 89 extend through the wall of shaft 60 permitting passage of air from air cleaner 85, through conduit 86, annular air intake passage 82, and through air intake openings 89 into the air intake compartment 88.

Openings 90 extend through shaft 60 and are aligned with openings 91 extending through hub 62 of rotor 52.

As illustrated in FIGS. II and III, radially extending partitions 62b, 62c and 62d in rotor 52 have passages 92 extending therethrough, permitting flow of air from air compartment 88 through openings 90, 91 and 92 to air discharge openings 93 and 94, extending through hub 62 and shaft 60 and communicating with exhaust compartment 95.

It should be noted that openings 90 are spaced longitudinally of shaft 60, communicating with passages 94 therethrough on opposite sides of transversely extending partition 70. Referring to FIG. III, it should further be noted that openings 90 are spaced circumferentially about shaft 60 from openings 94, such that air flowing from air compartment 88 to exhaust chamber 95 in shaft 60 provides cooling of substantially one-half of the interior of rotor 52. Cooling fins 67 on the inner surface of tubular member 65 increase the surface area contacted by cooling air and are preferably formed to dynamically balance the weight of rotor 52 about the axis of shaft 60.

Referring to FIG. II, carburetor 96 meters fuel supplied through fuel line 97 to a supply of air forming a combustible mixture of air and fuel, which is delivered through conduit 98 to annular fuel passage 99 formed in manifold 75. Fuel from annular passage 99 passes through fuel intake openings 100 into fuel compartment 101 in compartmentalized shaft 60. Fuel compartment 101 is defined by the inner wall of shaft 60, transversely extending partition 70, longitudinally extending partition 72, and closure member 74. Openings 102 and 104 extend through the wall of shaft 60 and hub 62, communicating with the inside of rotor 52 between partitions 62e and 62f. Fuel intake ports 105 extend through the wall of cylindrical portion 65 of rotor 52 such that fuel is delivered into chambers A-F defined by the outer surface 66 of rotor 52, the wall 12 of bore 10 extending through block 2, and surfaces 38' and 38'' on adjacent vanes 35.

Exhaust ports 110 extend through the wall of cylindrical portion 65 of rotor 52 and communicate with the interior of rotor 52 between radially extending partitions 62a and 62i. Openings 112 and 114 extend through walls of hub 62 and compartmentalized shaft 60 and communicate with exhaust compartment 95.

Exhaust compartment 95 in shaft 60 opens into exhaust manifold 130 secured to the end plate 6 of rotor housing 1 by suitable means such as bolts 113 and having outlet passages 132.

A flywheel 115 comprises discs 116 and 118 secured in spaced apart relation by spacer elements 120 and bolts 122.

Disc 116 has an opening extending therethrough with a collar 116a extending thereabout and is secured to the end of shaft 60 by a key 117.

Disc 118 has an opening extending through a central portion thereof and has a collar 118a thereabout into which the end of power output shaft 125 extends. Key 126 extends into a keyway in the end of shaft 125 and collar 118a.

As best illustrated in FIGS. II and VI fan blades 128 have opposite ends secured to ring elements 129a and 129b secured to discs 116 and 118 of flywheel 115, forming a combination flywheel-blower. Rotation of flywheel 115 imparts air flow outwardly toward outlet passages 132 formed in exhaust manifold 130. Thus, when the engine is operating pressure in exhaust compartment 95 of compartmentalized shaft 60 is below atmospheric pressure such that air is drawn from air compartment 88 through passages inside rotor 52 and exhaust gases are drawn from combustion chambers through ports 110.

SECOND EMBODIMENT

A second embodiment of the invention is illustrated by FIGS. IX-XIV of the drawing.

Numerals hereinbefore employed to designate like parts in the first embodiment are employed in the second embodiment. Only the structure differing from that of the first embodiment will be described.

As illustrated in FIGS. IX and X, each rocker shaft 15 has an arm 215 secured thereto by a key 216, the outer end of each of the arms having a follower roller 218 rotatably secured thereto. Rollers 218 extend into a groove 220 formed in camplate 222 which as illustrated in FIG. IX is connected by a key 224 to compartmentalized shaft 60.

From the foregoing it should be readily apparent that camplate 222, compartmentalized shaft 60 and rotor 52 are rigidly secured together and rotate as a common unit. As cam followers 218 move along groove 220, the sealing edge 38a on each of the vanes 35 is maintained in sealing relation with the outer surface 66 of rotor 52. The centerline of groove 220 is maintained in coinciding relation with the outer surface 66 of rotor 52.

Connector 225, illustrated in FIG. IX, forms a cover about cam disc 222 and arms 215 and is secured to end plate 4 of rotor housing 1' by bolts 44. Connector 225 is partially filled with lubricant providing lubrication for cam groove 220 and follower roller 218.

A modified form of the sealing apparatus for sealing between the edge of each of the vanes 35 and the outer surface 66 of rotor 52 is illustrated in FIGS. XIII and XIV of the drawing. Seal element 230, preferably constructed of suitable material, such as an alloy of carbon and aluminum, is positioned in a groove 232 extending longitudinally on the edge of the central portion 238 of vane 35. Seal element 230 is urged outwardly by corregated leaf springs 234.

As best illustrated in FIG. XIV, seal element 230 has a plurality of shoulders 233 extending outwardly from the backside thereof such that each of a plurality of springs 234 is positionable between the shoulders. Shoulders 233 limit longitudinal movement of springs 234 and prevents the possibility of scoring or scratching faces of end walls 4 and 6.

OPERATION

The operation and function of the apparatus hereinbefore described is briefly summarized as follows:

The particular embodiment of the invention illustrated FIGS. III employs six sealing vanes 35 dividing the volume of the bore 10 in block 2 into six chambers designated A, B, C, D, E and F.

Chamber A is the volume between the outer surface 66 of rotor 52, the wall 12 of the bore 10 thru block 2, vane 35A and vane 35F. Chamber B is the volume between vane 35A and vane 35B. The remaining chambers are designated between adjacent vanes in FIGS. III.

When the rotor is positioned as illustrated in FIG. III, the rotor 52 rotating in a clockwise direction, chamber A has been exhausted and the pressure therein is slightly less than atmospheric pressure because of the suction applied thereto as exhaust ports 110 pass between vanes 35A and 35F.

As hereinbefore described, the contour of the outer surface of rotor 52 between lines of contact of sealing beads on vanes 35A and 35F is equivalent to the arc of a circle, the center of curvature coinciding with the axis of compartmentalized shaft 60, which also coincides with the center of bore 10 thru block 2. The radius of curvature of the outer surface 66 of this section of rotor 52 is slightly less than the radius of bore 10 thru block 2. A minimum length of the arc is the distance between the lines of contact of sealing beads on vanes 35A and 35F when rotor 52 is in the position illustrated in FIG. III. This configuration of the end of rotor 52 allows the rotor to sequentially expel substantially all of the products of combustion from each of the operational chambers A-F as rotor 52 rotates through one revolution.

Chamber B, having been previously evacuated as the enlarged end portion of rotor 52 moved therethrough, is charged with fuel delivered from carburetor 96, through fuel intake compartment 101 of compartmentalized shaft 60 and through openings 102, 104 and fuel intake ports 105.

Fuel previously delivered into chamber C through ports 105 is compressed as rotor 52 decreases the volume thereof.

Fuel in chamber D has experienced near maximum compression. The contour of the end 66X of rotor 52 between lines of contact of vanes 35C and 35D is less than the radius of the opposite end 66Y of rotor 52 between lines of contact of vanes 35A and 35F. The contour of the arc between vanes 35C and 35D is designed to provide the desired compression ratio for a particular engine and to encourage the progressive burning of the charge of fuel after ignition.

As rotor 52 moves a few degrees in a clockwise direction from the position illustrated in FIG. III an electrical charge is delivered to spark plug S1 to ignite the compressed charge of fuel-air mixture in Chamber D. As combustion proceeds the pressure of the burning gases greatly exceed the pressure of the compressed fuel-air charge before ignition, driving the rotor 52 in a clockwise direction as viewed in FIG. III, causing the volume of Chamber D to be increased.

Chamber E contains burning fuel which is expanding, exerting force on rotor 52, urging the rotor in a clockwise direction.

It should be readily apparent that the volume of chamber E increases near to a maximum just prior to movement of exhaust port 110 into communication therewith for exhausting products of combustion.

Products of combustion in Chamber F are being expelled through exhaust ports 110 and exhaust openings 112 and 114 (FIG. IV) into exhaust compartment 95 in compartmentalized shaft 60.

It should be readily apparent that upon rotation of rotor 52 the volume of Chamber F will decrease approaching the volume of Chamber A as illustrated in FIG. III, thus forcing products of combustion out of Chamber F. It should also be appreciated that suction created by rotating blades 128 on flywheel 115 will further reduce pressure in Chamber F.

As described hereinbefore, air flowing through air cleaner 85 passes through air compartment 88, through openings 90, 91, 92 and through ports 94 into exhaust compartment 95. Thus, in addition to providing cooling for the segment of rotor 52 adjacent chambers D and E in block 2, adjacent locations of ignition, excess oxygen in the air is mixed with products of combustion in exhaust chamber 95. Mixing burning exhaust gases with an abundant supply of oxygen assures complete combustion of any fuel which may not have been consumed in the combustion chambers D and E to minimize exhausting carbon monoxide and hydrocarbons into the atmosphere through outlet passages 132.

From the foregoing it should be readily apparent that the engine hereinbefore described will dissipate excess heat because engine block 2 is cooled by circulating suitable coolant through passages formed therein while rotor 52 is cooled by circulating air through passages formed therein.

Chambers D and E, when the rotor is positioned as illustrated in FIGS. III and IV form relatively long thin combustion chambers bounded by surfaces adapted to dissipate heat such that temperature in the chambers will be less than that of internal combustion engines heretofore devised and particularly reciprocating piston and cylinder type engines wherein very high temperatures are reached along the axis of the cylinder intermediate opposite ends thereof. Maintaining the maximum temperature of combustion gas within limits discourages formation of nitrogen oxides which polute the atmosphere.

As rotor 52 turns through one revolution four "cycles of operation" (intake, compression, combustion and exhaust) occur in each of the chambers A-F.

The engine preferably has at least six or more operational chambers A-F and only four cycles of operation, providing an overlap of substantially fifty percent in all cycles. Thus, before the intake cycle, compression cycle, combustion cycle, or exhaust cycle is completed in one of the operational chambers the same cycle has been initiated in the next operational chamber. This overlap of operational cycles in the chambers assures a smooth flow of power and minimizes vibration.

It should be noted also that fuel intake ports 105 and exhaust ports 110 formed in rotor 52 are spaced apart a distance greater than the distance between adjacent vanes 35 to eliminate flow of fuel between intake ports 105 and exhaust ports 110, prior to combustion.

Referring to the first embodiment of the invention illustrated in FIGS. I-VIII of the drawing, the cam type action of the substantially oval shaped rotor 52 pushes the pivoted vanes 35 outwardly against the tension of springs 48 twice during each revolution as the contour of the outer surface 66 of rotor 52 permits. Springs 48 hold sealing beads 38a on tips of central portions 38 of each of the vanes 35 firmly against the smooth outer surface 66 of rotor 52 throughout each revolution of the rotor. Due to this action of the revolving rotor 52 and the springs 48, the capacity of each of the operational chambers A-F alternately increase and decrease twice during each revolution of rotor 52.

It should be noted that, except to overcome the friction involved, there is no net loss of energy when the rotor 52 pushes the vanes 35 outwardly against the tension of springs 48, since this energy is recovered when the springs 48 push vanes 35 inwardly to maintain contact with surface 66 of rotor 52 as the contour of rotor 52 permits. The shape of rotor 52 and the positioning of vanes 35 thereabout causes rotor 52 to be urged in a clockwise direction by forces equaling those urging the rotor in a counter-clockwise direction.

Except for sealing beads 38a which slide against the outer surface 66 of rotor 52, convex surfaces 38' are milled to conform to an arc of a section of a circle having a center of curvature coinciding with the axis of shaft 15, as has been hereinbefore described.

Inner surfaces 38" of vanes 35, having a truncated crescent-shaped cross-section, are tapered such that surface 38d is thinner than the surface on the opposite side of the blade adjacent which bead 38a is secured.

Passages 30 formed in engine block 2 in which vanes 35 oscillate are milled to conform to the shape of the central portion 38 of each of the vanes 35. It will be appreciated that when the vanes are in the outermost position the vane receiving passage 30 is evacuated of fluid except for a small open space 38c, due to the taper of the inside 38" of the central portion 38 of vane 35, space 38C widens appreciably as the central portion 38 of the vane moves toward the position of vane 35E, thus allowing gases in operational chambers A–F to flow freely between surfaces 30a and 38" as the vanes oscillate.

Sealing beads 38a (FIG. VII) urged against the outside surface 66 of rotor 52 are milled or ground to a curvature such that, as the rotor 52 turns and the vanes 35 oscillate, the line of contact of each bead 38a with the rotor 52 shifts such that pressure of gases in chambers A–F, during the compression and combustion cycles, urge vanes 35 to move toward surfaces 66 of rotor 52, thus intensifying the pressure exerted by springs 48 in holding sealing surfaces on vanes 35 firm against surface 66 of rotor 52.

In the second embodiment illustrated in FIGS. IX-XIV the cam 222 and follower 218 maintain the edge of vane 238 in close proximity of the surface 66 of rotor 52.

Seal element 230 (FIG. XIII) will be moved laterally across groove 232 by pressure of fluid indicated at P1 and P2. If P1 is greater than P2, seal element 230 will be urged into sealing engagement with surface 232b as illustrated and pressure P1 will urge the seal element into engagement with the surface of rotor 52. The area of surface 230a is greater than the area of curved surface 230c upon which pressure P1 also acts from the point of contact R.

If pressure P2 exceeds pressure P1, seal element 230 is urged against surface 232a and pressure P2 will urge surface 230b into sealing engagement with rotor 52 for the area of surface 230a is also greater than curved surface 230b from the point of contact R.

It should be apparent that the embodiments of the invention hereinbefore described are exemplary of a preferred form of the invention. However, other and further embodiments of the invention may be devised without departing from the basic concept thereof.

Having thus described my invention, I claim:

1. An internal engine comprising: a hollow engine block having a circular bore extending therethrough; end plates adjacent opposite ends of said engine block, each of said end plates having openings extending therethrough; a hollow shaft having a central axis, said hollow shaft being rotatably secured in said openings in the end plates; partitions in the hollow portion of the shaft arranged to divide the interior of the shaft into an air intake compartment, a fuel intake compartment and an exhaust compartment; a hollow substantially oval-shaped rotor secured to the shaft, said rotor being rotatably disposed in the bore in the engine block and having first and second arcuate end portions, the first of said arcuate end portions being spaced from said central axis a distance greater than the distance the second arcuate end portion is spaced from the central axis; partitions in the rotor forming an air chamber, a fuel chamber, and an exhaust chamber, said hollow shaft having air intake openings communicating with the air intake compartment and the air chamber, and having air discharge openings communicating with the air chamber and the exhaust chamber, and having fuel intake openings communicating with said fuel compartment and said fuel chamber; said rotor having fuel intake ports communicating with the fuel chamber and the bore in the engine block, and having exhaust ports communicating with the bore in the engine block and the exhaust chamber; said shaft having openings communicating with the exhaust chamber and the exhaust compartment; sealing vanes; each of said sealing vanes having a concave surface and a convex surface; a sealing bead secured to each of said vanes, said sealing bead being positioned such that a projection of the arc of the convex surface passes through said bead wherein upon rotation of the rotor a line of contact between the rotor and the bead moves from one side of the projected arc to the other side of the projected arc; an arm secured to each of said vanes; means to pivotally secure each of said arms to said engine block such that each vane is pivotal about a center of curvature of said convex surface; means to urge each vane into engagement with the rotor, said vanes being arranged to form a plurality of firing chambers in the bore; means to deliver fuel to the fuel compartment; and means to ignite fuel in each firing chamber.

2. The combination called for in claim 1 wherein the means to pivotally secure each of said arms to the engine block comprises: a rocker shaft extending through openings in said arms; means to pivotally secure said rocker shaft to said engine block; and resilient means secured to said shaft such that the rocker shaft is resiliently biased toward a position wherein the sealing bead engages the rotor.

3. The combination called for in claim 1 wherein the means to pivotally secure each of said arms to the engine block comprises: a rocker shaft extending through openings in said arms; means to pivotally secure said rocker shaft to said engine block; and wherein the means to urge a surface on the vane into engagement with the rotor comprises, a cam plate secured to the hollow shaft; an arm secured to said rocker shaft; and follower means secured to said arm engageable with said cam plate, said cam plate being shaped to maintain the vane in engagement with the rotor.

4. The combination called for in claim 1 wherein each of said vanes has a truncated crescent-shaped crosssection.

5. The combination called for in claim 4 wherein said engine block has truncated crescent-shaped passages formed therein positioned to receive said truncated crescent-shaped vanes.

6. The combination called for in claim 1 wherein said fuel intake ports and said exhaust ports are spaced apart a distance substantially equal to the maximum distance between lines of contact between the rotor and sealing beads on adjacent sealing vanes.

7. An internal combustion engine comprising: a rotor housing having a cylindrical bore formed therein; a shaft; means to rotatably secure shaft in the bore of the rotor housing; a rotor secured to said shaft; sealing vanes; each of said sealing vanes having a concave surface and a convex surface; a sealing bead secured to each of said vanes, said sealing bead being positioned such that a projection of the arc of the convex surface passes through said bead wherein upon rotation of the rotor a line of contact between the rotor and the bead moves from one side of the projected arc to the other side of the projected arc; an arm secured to each of said vanes; means to pivotally secure each of said arms to said rotor housing such that each vane is pivotal about a center of curvature of said convex surface; means to urge each vane into engagement with the rotor, said vanes being arranged to form a plurality of firing chambers in the bore; means communicating with each of said firing chambers for supplying fuel thereto; means communicating with each of said firing chambers for igniting fuel therein; and means communicating with each of said firing chambers for exhausting combustion gases.

8. The combination called for in claim 7 wherein, the means to urge each vane into engagement with the rotor comprises: resilient means secured to said rotor housing, and means to secure said resilient means to each of said vanes.

9. The combination called for in claim 7 wherein the means to urge each vane into engagement with the rotor comprises: cam means; means to secure said cam means to said shaft; follower means movable by said cam; and means to secure said follower means to each of said vanes.

10. The combination called for in claim 7 wherein each of said vanes comprises an elongated member having a truncated crescent-shaped cross-section, and wherein the rotor housing has elongated truncated crescent-shaped passages formed therein arranged to receive said vanes.

11. The combination called for in claim 7 wherein said shaft has a passage extending therethrough and wherein said rotor has passages formed therein; and means to circulate coolant through passages in the shaft and the rotor to dissipate heat therefrom.

12. The combination called for in claim 7 with the addition of, a fuel chamber and an exhaust chamber inside said rotor, fuel intake ports extending through said rotor permitting flow of fuel into the bore in the rotor housing, exhaust ports extending through the rotor permitting flow of exhaust gases from the bore in the rotor housing into the exhaust chamber; and means of communicating with said exhaust chamber to maintain pressure therein at less than atmospheric pressure.

13. The combination called for in claim 12 wherein the fuel intake ports and the exhaust ports are spaced apart a distance greater than the distance between adjacent vanes.

14. An internal combustion engine comprising: a hollow engine block having a circular bore extending therethrough; end plates adjacent opposite ends of said engine block, each of said end plates having openings extending therethrough; a hollow shaft having a central axis, said hollow shaft being rotatably secured in said openings in the end plates; partitions in the hollow portion of the shaft arranged to divide the interior of the shaft into an air intake compartment, a fuel intake compartment and an exhaust compartment; a hollow oval-shaped rotor secured to the shaft, said rotor being rotatably disposed in the bore in the engine block and having first and second arcuate end portions, the first of said arcuate end portions being spaced from said central axis a distance greater than the distance the second arcuate end portion is spaced from the central axis; partitions in the rotor forming an air chamber, a fuel chamber, and an exhaust chamber, said hollow shaft having air intake openings communicating with the air intake compartment and the air chamber, and having air discharge openings communicating with the air chamber and the exhaust chamber, and having fuel intake openings communicating with said fuel compartment and said fuel chamber; said rotor having fuel intake ports communicating with the fuel chamber and the bore in the engine block, and having exhaust ports communicating with the bore in the engine block and the exhaust chamber; said shaft having openings communicating with the exhaust chamber and the exhaust compartment; a plurality of vanes engageable with the rotor and engine block to form a plurality of firing chambers in the bore, each of said vanes having a truncated crescent-shaped cross-section; means to pivotally secure each of said vanes to said engine block; means to urge a surface on each of said vanes into engagement with the rotor; means to deliver fuel to the fuel compartment; and means to ignite fuel in each firing chamber, wherein each of said truncated crescent-shaped vanes has a concave surface and a convex surface, said convex surface having a radius of curvature concentric with an axis about which said vane is pivotally secured; a bead secured to an edge of said vane adjacent said convex surface; said bead having a surface thereon positioned such that a projection of the arc of the convex surface passes through said bead wherein upon rotation of the rotor a line of contact between the rotor and the bead moves from one side of the projected arc to the other side of the projected arc.

15. An internal combustion engine comprising: a rotor housing having a cylindrical bore formed therein; a plurality of sealing vanes; each of said sealing vanes having a concave surface and a convex surface; an arm secured to each of said vanes; means pivotally securing each of said arms to said rotor housing such that each vane is pivotal about a center of curvature of said convex surface; a shaft; means to rotatably secure said shaft in the bore in the rotor housing; a hollow rotor having an oval-shaped cross-section secured to said shaft, said shaft having a central axis; a sealing bead secured to each of said vanes, said sealing bead being positioned such that a projection of the arc of the convex surface passes through said bead wherein upon rotation of the rotor a line of contact between the rotor and the bead moves from one side of the projected arc to the other side of the projected arc; a first end of said rotor cross-section having intake and exhaust ports spaced apart a distance substantially equal to maximum spacing between sealing surfaces on adjacent sealing vanes; a partition in said hollow rotor between said intake port and said exhaust port; a first arcuate surface on said rotor extending between said intake port and said exhaust port, said first arcuate surface being substantially parallel to the wall of the bore through the rotor housing and having a radius of curvature slightly less than the radius of said bore; a second end of said rotor cross-section having a second arcuate surface thereon substantially parallel to the wall of said bore but extending a distance less than spacing between sealing surfaces on adjacent sealing vanes, said second arcuate surface having a radius of curvature somewhat less than the radius of curvature of said first arcuate surface on the first end of the rotor cross-section thus forming a compression chamber between adjacent sealing vanes, the wall of the bore, and the second end of said rotor; means communicating with said hollow rotor to supply fuel through said intake port; means adjacent a first end of each of said compression chambers for igniting fuel therein when a sealing surface on a vane adjacent a second end of said compression chamber is a greater distance from said central axis than a sealing surface on a vane adjacent the first end of said compression chamber; and means communicating with said hollow rotor for exhausting combustion gases flowing through said exhaust port.

* * * * *